(12) United States Patent
Bloy

(10) Patent No.: US 12,248,830 B1
(45) Date of Patent: Mar. 11, 2025

(54) SYSTEM AND METHOD FOR MODIFYING A CARD ISSUANCE FILE

(71) Applicant: The Toronto-Dominion Bank, Toronto (CA)

(72) Inventor: Adrian Bloy, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 18/454,866

(22) Filed: Aug. 24, 2023

(51) Int. Cl.
*G06K 19/06* (2006.01)
*G06F 21/60* (2013.01)

(52) U.S. Cl.
CPC ..... *G06K 19/06037* (2013.01); *G06F 21/608* (2013.01)

(58) Field of Classification Search
CPC ............. G06K 19/06037; G06F 21/608
USPC ........................................... 235/494
See application file for complete search history.

(56) References Cited

U.S. PATENT DOCUMENTS

| | | | |
|---|---|---|---|
| 5,025,399 A * | 6/1991 | Wendt | G06K 1/121 358/1.18 |
| 6,196,459 B1 * | 3/2001 | Goman | G06Q 20/341 235/492 |
| 6,202,155 B1 * | 3/2001 | Tushie | G06Q 20/355 726/20 |
| 8,700,531 B2 | 4/2014 | Gupta | |
| 9,224,141 B1 | 12/2015 | Lamba et al. | |
| 9,805,362 B2 | 10/2017 | Kobylkin et al. | |
| 10,970,734 B2 | 4/2021 | Chopra et al. | |
| 11,514,432 B2 | 11/2022 | Kasul et al. | |
| 2009/0299844 A1 | 12/2009 | Reilly et al. | |
| 2010/0094698 A1 | 4/2010 | Cawley | |
| 2016/0162926 A1 * | 6/2016 | Patterson | G06Q 20/405 705/14.27 |
| 2021/0035147 A1 | 2/2021 | Andrews et al. | |
| 2021/0406868 A1 | 12/2021 | Brightman et al. | |
| 2023/0121749 A1 * | 4/2023 | Lee | G06Q 20/065 713/171 |

FOREIGN PATENT DOCUMENTS

CA          2720120 A1    4/2012

* cited by examiner

*Primary Examiner* — Ahshik Kim
(74) *Attorney, Agent, or Firm* — Rowand LLP

(57) ABSTRACT

A system comprises a communications module; at least one processor coupled with the communications module; and a memory coupled to the processor, the memory storing processor-executable instructions that, when executed, configure the at least one processor to obtain a card issuance file that includes card data for printing a physical card; modify the card issuance file to include data for printing at least one machine-readable code on the physical card; and store the modified card issuance file in a data queue that includes a batch of card issuance files to be sent to a printing system.

18 Claims, 9 Drawing Sheets

SYSTEM AND METHOD FOR MODIFYING A CARD ISSUANCE FILE

TECHNICAL FIELD

The present application relates to systems and methods for modifying a card issuance file.

BACKGROUND

Card issuance files may include machine-executable instructions that instruct a printing system to print, emboss or laser one or more elements on a physical card. For example, the card issuance files may include card data such as for example a card number, a card verification value, and an expiration date and this card data may be printed, embossed or lasered onto the physical card by the printing system.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
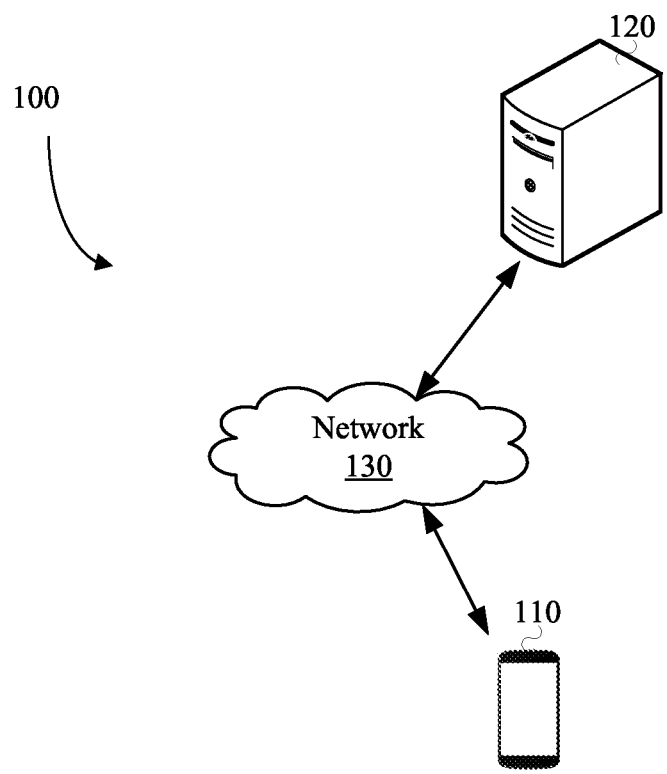
FIG. 1 is a schematic operation diagram illustrating an operating environment of an example embodiment.

Accordingly, in an aspect there is provided a system comprising a communications module; at least one processor coupled with the communications module; and a memory coupled to the processor, the memory storing processor-executable instructions that, when executed, configure the at least one processor to obtain a card issuance file that includes card data for printing a physical card; modify the card issuance file to include data for printing at least one machine-readable code on the physical card; and store the modified card issuance file in a data queue that includes a batch of card issuance files to be sent to a printing system.

In one or more embodiments, the instructions, when executed, further configure the at least one processor to receive a request to modify the card issuance file to include the at least one machine-readable code on the physical card.

In one or more embodiments, the instructions, when executed, further configure the at least one processor to generate the at least one machine-readable code to provide data to a scanning device in response to being scanned by the scanning device.

In one or more embodiments, the card issuance file is obtained from the data queue.

In one or more embodiments, the instructions, when executed, further configure the at least one processor to analyze the card issuance file to identify at least one position for the at least one machine-readable code on the physical card, the card issuance file modified to include the data for printing the at least one machine-readable code on the physical card at the at least one position on the physical card.

In one or more embodiments, the instructions, when executed, further configure the at least one processor to send an application programming interface request that defines content to be encoded on the at least one machine-readable code; receive an application programming interface response that includes the at least one machine-readable code; extract image data that includes the at least one machine-readable code from the application programming interface response; and store the image data in a database.

In one or more embodiments, the content to be encoded on the at least one machine-readable code includes account data received together with a request to generate the card issuance file.

In one or more embodiments, the account data includes loyalty point account data.

In one or more embodiments, the instructions, when executed, further configure the at least one processor to encrypt the data queue; and send the encrypted data queue to the printing system.

In one or more embodiments, the encrypted data queue is sent to the printing system in response to detecting a trigger condition.

According to another aspect, there is provided a computer-implemented method performed by at least one processor, the method comprising obtaining a card issuance file that includes card data for printing a physical card; modifying the card issuance file to include data for printing at least one machine-readable code on the physical card; and storing the modified card issuance file in a data queue that includes a batch of card issuance files to be sent to a printing system.

In one or more embodiments, the computer-implemented method further comprises receiving a request to modify the card issuance file to include the at least one machine-readable code on the physical card.

In one or more embodiments, the computer-implemented method further comprises generating the at least one machine-readable code to provide data to a scanning device in response to being scanned by the scanning device.

In one or more embodiments, the card issuance file is obtained from the data queue.

In one or more embodiments, the computer-implemented method further comprises analyzing the card issuance file to identify at least one position for the at least one machine-readable code on the physical card, the card issuance file modified to include the data for printing the at least one machine-readable code on the physical card at the at least one position on the physical card.

In one or more embodiments, the computer-implemented method further comprises sending an application programming interface request that defines content to be encoded on the at least one machine-readable code; receiving an application programming interface response that includes the at least one machine-readable code; extracting image data that includes the at least one machine-readable code from the application programming interface response; and storing the image data in a database.

In one or more embodiments, the content to be encoded on the at least one machine-readable code includes account data received together with a request to generate the card issuance file.

In one or more embodiments, the computer-implemented method further comprises encrypting the data queue; and sending the encrypted data queue to the printing system.

In one or more embodiments, the encrypted data queue is sent to the printing system in response to detecting a trigger condition.

According to another aspect there is provided at least one non-transitory computer readable storage medium comprising processor-executable instructions which, when executed, configure at least one processor to obtain a card issuance file that includes card data for printing a physical card; modify the card issuance file to include data for printing at least one machine-readable code on the physical card; and store the modified card issuance file in a data queue that includes a batch of card issuance files to be sent to a printing system.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the present application, examples involving a general-purpose computer, aspects of the disclosure transform the general-purpose computer into a special-purpose computing device when configured to execute the instructions described herein.

In the present application, various functionalities discussed herein may be performed by a single processor or by any one of one or more processors, either alone or in combination.

In one aspect of the present application, methods and systems are described for modifying a card issuance file to include data for printing at least one machine-readable code on a physical card. The modified card issuance file may be stored in a data queue that includes a batch of card issuance files. Responsive to a trigger condition, the data queue may be encrypted and sent to a printing system. During printing of the physical card, the machine-readable instructions of the modified card issuance file may cause the printing system to print the at least one machine-readable code on the physical card. It will be appreciated that printing the physical card may include printing, embossing or lasering the physical card.

The machine-readable code may be encoded such that the machine-readable code provides data to a scanning device when it is scanned. In one or more embodiments, the machine-readable code may be encoded to provided loyalty point account data to the scanning device. In this manner, the machine-readable code may be readily accessible at the point of sale and this may be particularly advantageous when payment at the point of sale is done using the physical card.

FIG. 1 is a schematic operation diagram illustrating an operating environment of an example embodiment. As shown, the system 100 includes a client device 110 and a server computer system 120 coupled to one another through a network 130, which may include a public network such as the Internet and/or a private network. The client device 110 and the server computer system 120 may be in geographically disparate locations. Put differently, the client device 110 and the server computer system 120 may be located remote from one another.

The client device 110 may be a smartphone as shown in FIG. 1. However, the client device 110 may be a computing device of another type such as for example a laptop computer, a personal computer, a tablet computer, a notebook computer, a hand-held computer, a personal digital assistant, a portable navigation device, a mobile phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments.

The server computer system 120 is a computer server system. A computer server system may, for example, be a mainframe computer, a minicomputer, or the like. In some implementations thereof, a computer server system may be formed of or may include one or more computing devices. A computer server system may include and/or may communicate with multiple computing devices such as, for example, database servers, computer servers, and the like. Multiple computing devices such as these may be in communication using a computer network and may communicate to act in cooperation as a computer server system. For example, such computing devices may communicate using a local-area network (LAN). In some embodiments, a computer server system may include multiple computing devices organized in a tiered arrangement. For example, a computer server system may include middle tier and back-end computing devices. In some embodiments, a computer server system may be a cluster formed of a plurality of interoperating computing devices.

The server computer system 120 may be an application server and/or a web server. For example, a mobile application may be resident on the client device 110 and may allow the server computer system 120 to communicate with the client device 110. For example, the mobile application may present one or more graphical user interfaces on a display screen of the client device 110 that may allow the server computer system 120 to communicate with the client device 110.

The server computer system 120 may additionally or alternatively be a financial institution server and may maintain a database that includes various data records. At least some of the data records may be associated with customer bank accounts and/or credit card accounts. At least some of the data records may include additional account data such as for example the name, age, address of the customer, etc. and the account data may be associated with the customer bank accounts and/or credit card accounts.

As will be described in more detail below, the mobile application resident on the client device 110 may be used to request a new physical credit card or may be used to renew an existing physical credit card. The mobile application may present one or more graphical user interfaces on the client device 110 that may allow a user to request modification of a card issuance file that is to be used to print the physical card. For example, within the mobile application the user may be asked if they would like to print a machine-readable code on the physical credit card that may be scanned by a scanning device to provide account data such as loyalty point data to the scanning device.

The network 130 is a computer network. In some embodiments, the network 130 may be an internetwork such as may be formed of one or more interconnected computer networks. For example, the network 130 may be or may include an Ethernet network, an asynchronous transfer mode (ATM) network, a wireless network, a telecommunications network, or the like.

Figure 2:
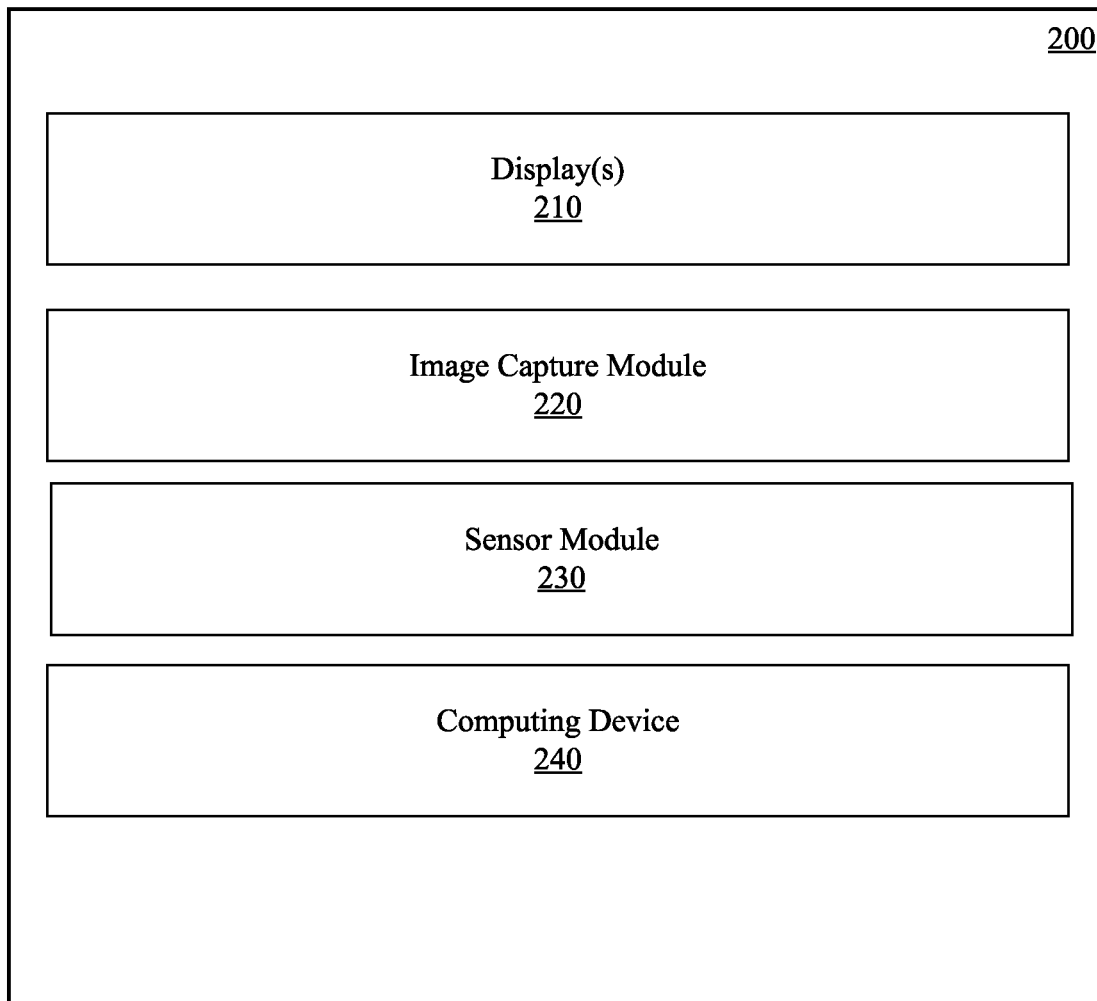
FIG. 2 is a simplified schematic diagram showing components of a computing device.

FIG. 2 is a simplified schematic diagram showing components of an exemplary computing device 200. The client device 110 may be of the same type as computing device 200. The computing device 200 may include modules including, as illustrated, for example, one or more displays 210, an image capture module 220, a sensor module 230, and a computer device 240.

The one or more displays 210 are a display module. The one or more displays 210 are used to display screens of a graphical user interface that may be used, for example, to communicate with the server computer system 120 (FIG. 1). The one or more displays 210 may be internal displays of the computing device 200 (e.g., disposed within a body of the computing device).

The image capture module 220 may be or may include a camera. The image capture module 220 may be used to obtain image data, such as images. The image capture module 220 may be or may include a digital image sensor system as, for example, a charge coupled device (CCD) or a complementary metal-oxide-semiconductor (CMOS) image sensor.

The sensor module 230 may be a sensor that generates sensor data based on a sensed condition. By way of example, the sensor module 230 may be or include a location subsystem which generates geolocation data indicating a location of the computing device 200. The location may be the current geographic location of the computing device 200. The location subsystem may be or include any one or more of a global positioning system (GPS), an inertial navigation system (INS), a wireless (e.g., cellular) triangulation system, a beacon-based location system (such as a Bluetooth low energy beacon system), or a location subsystem of another type.

The computer device 240 is in communication with the one or more displays 210, the image capture module 220, and the sensor module 230. The computer device 240 may be or may include a processor which is coupled to the one or more displays 210, the image capture module 220, and/or the sensor module 230.

Figure 3:
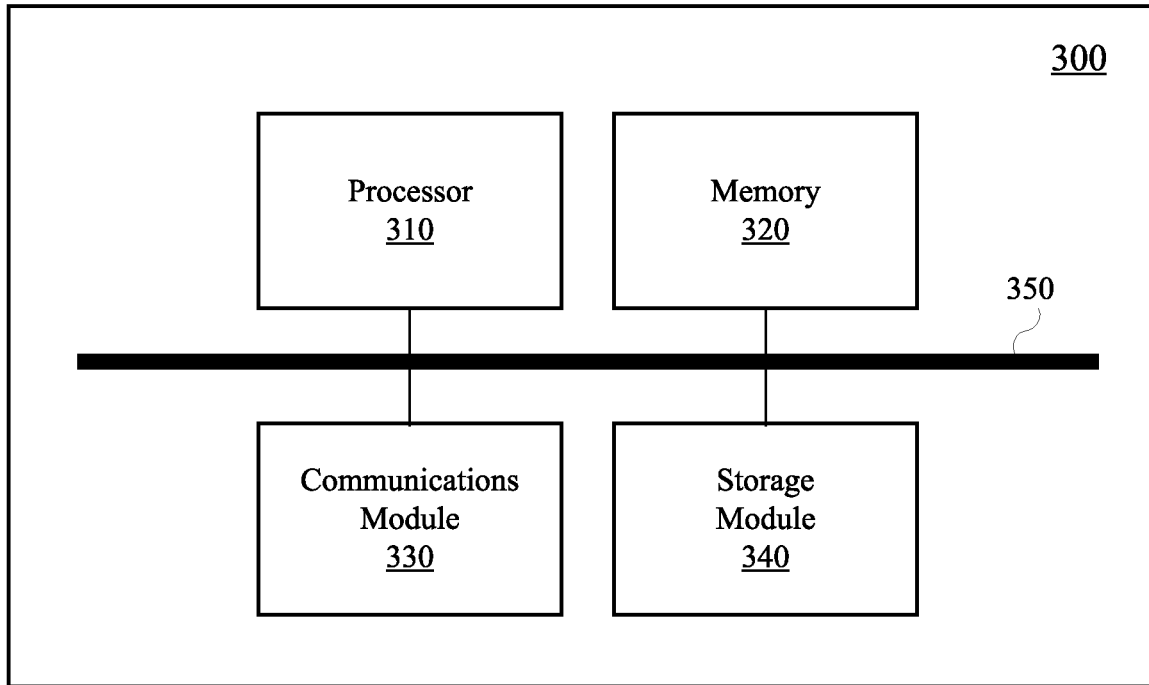
FIG. 3 is a high-level schematic diagram of an example computer device.

Referring now to FIG. 3, a high-level operation diagram of an example computer device 300 is shown. In some embodiments, the computer device 300 may be exemplary of the computer device 240 (FIG. 2) and/or the server computer system 120.

The example computer device 300 includes a variety of modules. For example, as illustrated, the example computer device 300 may include a processor 310, a memory 320, a communications module 330, and/or a storage module 340. As illustrated, the foregoing example modules of the example computer device 300 are in communication over a bus 350.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are non-transitory computer-readable storage mediums. A computer-readable medium may be organized using a file system such as may be administered by an operating system governing overall operation of the example computer device 300.

The communications module 330 allows the example computer device 300 to communicate with other computer or computing devices and/or various communications networks. For example, the communications module 330 may allow the example computer device 300 to send or receive communications signals. Communications signals may be sent or received according to one or more protocols or according to one or more standards. For example, the communications module 330 may allow the example computer device 300 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 330 may allow the example computer device 300 to communicate using near-field communication (NFC), via Wi-Fi™, using Bluetooth™ or via some combination of one or more networks or protocols. In some embodiments, all or a portion of the communications module 330 may be integrated into a component of the example computer device 300. For example, the communications module may be integrated into a communications chipset. In some embodiments, the communications module 330 may be omitted such as, for example, if sending and receiving communications is not required in a particular application.

The storage module 340 allows the example computer device 300 to store and retrieve data. In some embodiments, the storage module 340 may be formed as a part of the memory 320 and/or may be used to access all or a portion of the memory 320. Additionally or alternatively, the storage module 340 may be used to store and retrieve data from persisted storage other than the persisted storage (if any) accessible via the memory 320. In some embodiments, the storage module 340 may be used to store and retrieve data in a database. A database may be stored in persisted storage. Additionally or alternatively, the storage module 340 may access data stored remotely such as, for example, as may be accessed using a local area network (LAN), wide area network (WAN), personal area network (PAN), and/or a storage area network (SAN). In some embodiments, the storage module 340 may access data stored remotely using the communications module 330. In some embodiments, the storage module 340 may be omitted and its function may be performed by the memory 320 and/or by the processor 310 in concert with the communications module 330 such as, for example, if data is stored remotely. The storage module may also be referred to as a data store.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

Figure 4:
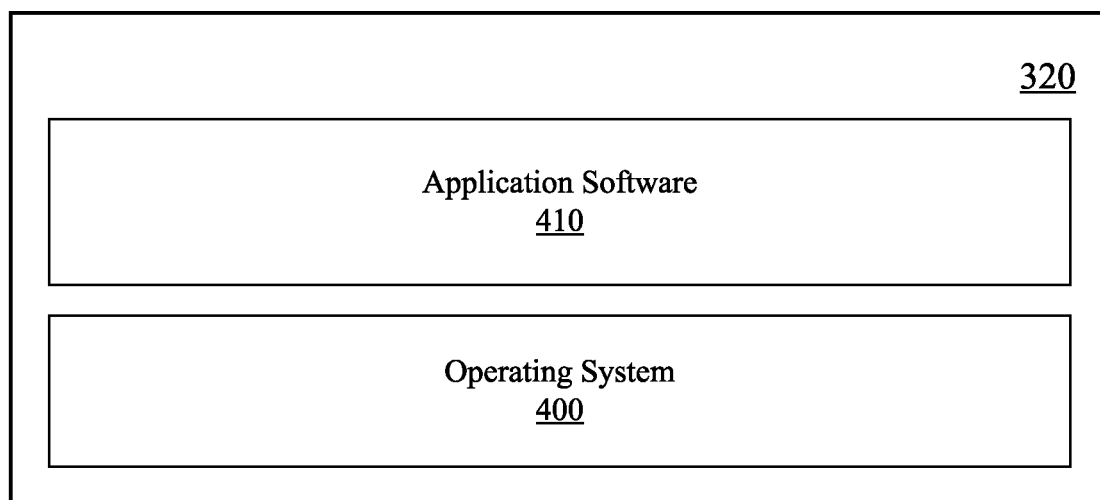
FIG. 4 shows a simplified organization of software components stored in a memory of the example computer device of FIG. 3.

FIG. 4 depicts a simplified organization of software components stored in the memory 320 of the example computer device 300 (FIG. 3). As illustrated, these software components include an operating system 400 and an application 410.

The operating system 400 is software. The operating system 400 allows the application 410 to access the processor 310 (FIG. 3), the memory 320, and the communications module 330 of the example computer device 300 (FIG. 3). The operating system 400 may be, for example, Google™ Android™, Apple™ iOS™, UNIX™, Linux™, Microsoft™ Windows™, Apple OSX™ or the like.

The application 410 adapts the example computer device 300, in combination with the operating system 400, to operate as a device performing a particular function. For example, the application 410 may cooperate with the operating system 400 to adapt a suitable embodiment of the example computer device 300 to operate as the computer device 240 (FIG. 2) and/or the server computer system 120.

While a single application 410 is illustrated in FIG. 3, in operation the memory 320 may include more than one application 410 and different applications 410 may perform different operations. For example, in at least some embodiments in which the computer device 300 is functioning as the client device 110, the applications 410 may include a banking application. The banking application may be configured for secure communications with the server computer system 120 and may provide various banking functions such as, for example, the ability to display a quantum of value in one or more transfer records (e.g. display balances), configure transfers of data (e.g. bill payments and other transfers), and account management functions. The mobile banking application may allow a user to request a new physical credit card or to renew an existing physical credit card.

By way of further example, in at least some embodiments in which the computer device 300 functions as the client device 110, the applications 410 may include a web browser, which may also be referred to as an Internet browser. In at least some such embodiments, the server computer system 120 may be a web server that may serve one or more of the graphical user interfaces described herein. The web server may cooperate with the web browser and may serve as an interface when the interface is requested through the web browser. For example, the web browser may serve as a mobile or online banking interface. The mobile banking interface may provide various banking functions such as, for example, the ability to display a quantum of value in one or more transfer records (e.g. display balances), configure transfers of data (e.g. bill payments and other transfers), and account management functions. The mobile banking interface may allow a user to request a new physical credit card or to renew an existing physical credit card.

In one or more embodiments, the client device 110 may initiate communication with the server computer system 120 when the mobile application is opened on the client device 110 and/or when the mobile banking interface is opened within a web browser executing on the client device 110. In response, the server computer system 120 may present one or more graphical user interfaces on a display screen of the client device 110. The one or more graphical user interfaces may include one or more selectable interface elements that may be selected by a user of the client device 110 by, for example, performing a tap gesture at a location of the one or more selectable interface elements. It will be appreciated that other types of interface elements may be presented such as for example interface elements that include an input field allowing the user to input and submit text to the server computer system 120.

Within the mobile application and/or mobile banking interface, the user of the client device 110 may submit a request for a new credit card and/or may submit a request to renew an existing credit card. In response, the server computer system 120 may present one or more graphical user interfaces on the display screen of the client device 110. The one or more graphical user interfaces may include a request for information required to complete a credit card application form. The information may include information required to fulfill know your customer (KYC) requirements and/or information required to determine whether or not the user is approved for the credit card. It will be appreciated that in embodiments where the user is renewing an existing credit card, the server computer system 120 may present one or more graphical user interfaces that may include a request to confirm or update information previously used to approve the user for the existing credit card.

The server computer system 120 may analyze the information received from the client device 110 to make an informed decision as to whether or not the credit card is to be issued to the user.

During the credit card application or credit card renewal process, the server computer system 120 may prompt the user for additional information from the user that may be used to customize a physical credit card for the user. In one or more embodiments, the additional information may include a request for loyalty point account data. For example, the server computer system 120 may prompt the user to select one or more loyalty point programs where the user has an existing loyalty point account. The user may select the one or more loyalty point programs and in response the server computer system 120 may cause the client device 110 to display an input field for entering loyalty point account data such as for example a loyalty point account number. The user may enter the loyalty point account number and in response the server computer system 120 may store the loyalty point account data in a database in association with the new or renewed credit card account. It will be appreciated that the user may select more than one loyalty point program and the loyalty point account data for each loyalty point program may be stored in the database.

In one or more embodiments, a loyalty point account may be created when the credit card account is being opened or renewed. For example, the user may indicate that they do not have a loyalty point program and in response the server computer system 120 may cause the client device 110 to display a selectable option to create the loyalty point account. In response to selection of the selectable option, the server computer system 120 may perform operations to create the loyalty point account and to store the loyalty point account data for the loyalty point account in the database.

As will be described in more detail below, the loyalty point account data may be encoded as a machine-readable code that may be printed on the physical credit card. The machine-readable code may provide the loyalty point account data to a scanning device when it is scanned by the scanning device. It will be appreciated that other types of data may be obtained by the server computer system 120 and may be encoded as the machine-readable code. Examples of other types of data that may be encoded as machine-readable code may include rewards account data that may be used to track purchases made by the user. One example is a coffee shop rewards account that may gift a free coffee to the user every time the user purchases nine (9) coffees from the coffee shop.

In one or more embodiments, the server computer system 120 may allow the user to select where the machine-readable code is printed on the physical credit card. For example, responsive to obtaining the loyalty point account data, the server computer system 120 may generate the machine-readable code and may display a graphic that represents a front and/or a back of the physical credit card. The server computer system 120 may overlay the machine-readable code on the graphic on the front or the back of the physical credit card. The user may move the machine-readable code by performing a drag and drop gesture on a display screen of the client device 110 and this may be done to position the machine-readable code on the graphic of the physical credit card. In this manner, the user may select where each machine-readable code is to be printed on the physical credit card.

Figure 5:
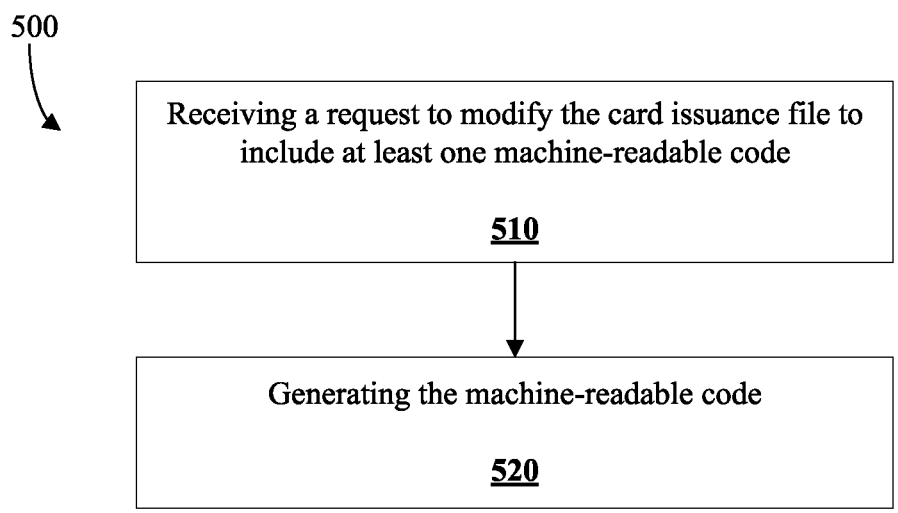
FIG. 5 is a flowchart showing operations performed by a server computer system in generating a machine-readable code according to an embodiment.

The server computer system 120 may generate a machine-readable code based on the data obtained from the user. Reference is made to FIG. 5, which illustrates, in flowchart form, a method 500 for generating a machine-readable code. The method 500 may be implemented by a computing device having suitable processor-executable instructions for causing the computing device to carry out the described operations. The method 500 may be implemented, in whole or in part, by the server computer system 120.

The method 500 includes receiving a request to modify a card issuance file to include at least one machine-readable code (step 510).

In one or more embodiments, the request to modify the card issuance file may be received in response to submission of the request to create or renew a credit card. For example, during the credit card application or renewal process, the server computer system 120 may prompt the user for additional information that may be used to customize the physical credit card for the user. When it is determined that the user has provided the additional information, the server computer system 120 may receive the request to modify the card issuance file to include at least one machine-readable code. In another example, during the credit card application or renewal process, the server computer system 120 may ask the user if they would like to modify the card issuance file to include the at least one machine-readable code. Specifically, the server computer system 120 may present a graphical user interface on a display screen of the client device 110 that may include a selectable interface element such as for example a toggle or a radio button that may be selected by the user to request that the card issuance file be modified to include at least one machine-readable code.

The request to modify the card issuance file may include data that may be used to generate the machine-readable code. For example, the data that may be used to generate the machine-readable code may include loyalty point account data.

The method 500 includes generating the machine-readable code (step 520).

In response to receiving the request to modify the card issuance file to include the at least one machine-readable code, the server computer system 120 generates the machine-readable code.

In one or more embodiments, the server computer system 120 may engage an application programming interface (API) to automatically generate the machine-readable code. The APIs may be engaged by way of an API server computer system. Example APIs may include a quick response (QR) code generator API. In one example, the server computer system 120 may determine one or more endpoints associated with the API. The endpoints may include, for example, one or more uniform resource locators (URLs) that may receive the API request.

The server computer system 120 may send an HTTP request to an endpoint of the API. The request may include a GET or a POST request. The HTTP request may define parameters that define the content to be encoded on the QR code. For example, the parameters may include the data that is to be used to generate the machine-readable code. Specifically, in one or more embodiments, the parameters may include the loyalty point account number. As such, the HTTP request may include the loyalty point account number in the request payload.

In response to receiving the HTTP request, the API server computer system may process the request and generate the QR code image. The API server computer system may respond to the HTTP request by sending the QR code image in a particular format which may include a PNG, JPEG, or SVG format. The response may additionally include metadata and/or other response details.

The server computer system 120 may receive the QR code image in the API response. The server computer system 120 may extract the image data from the received QR code image and, if required, may translate the image data into a format compliant with the card issuance file. For example, the card issuance file may only handle image files that are in the PNG format and as such the server computer system 120 may store the image data in the PNG format. The image data may be stored in a database in association with the credit card account.

Figure 6:
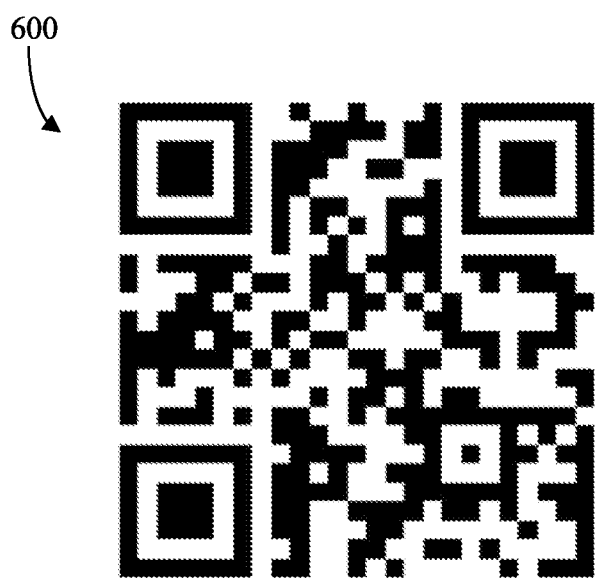
FIG. 6 is an example machine-readable code according to an embodiment.

An example machine-readable code 600 is shown in FIG. 6. As can be seen, the machine-readable code 600 includes a QR code that is encoded such that the machine-readable code 600 provides data to a scanning device when scanned thereby. The data may include, for example, the loyalty point account data.

The machine-readable code may be encoded such that the machine-readable code provides data to a scanning device when it is scanned Although the machine-readable code is described as being generated as a QR code, it will be appreciated that other types of machine-readable codes may be used such as for example a bar code or any other type of machine-readable code that can be scanned and read electronically by a scanning device and/or a computing device.

Figure 7:
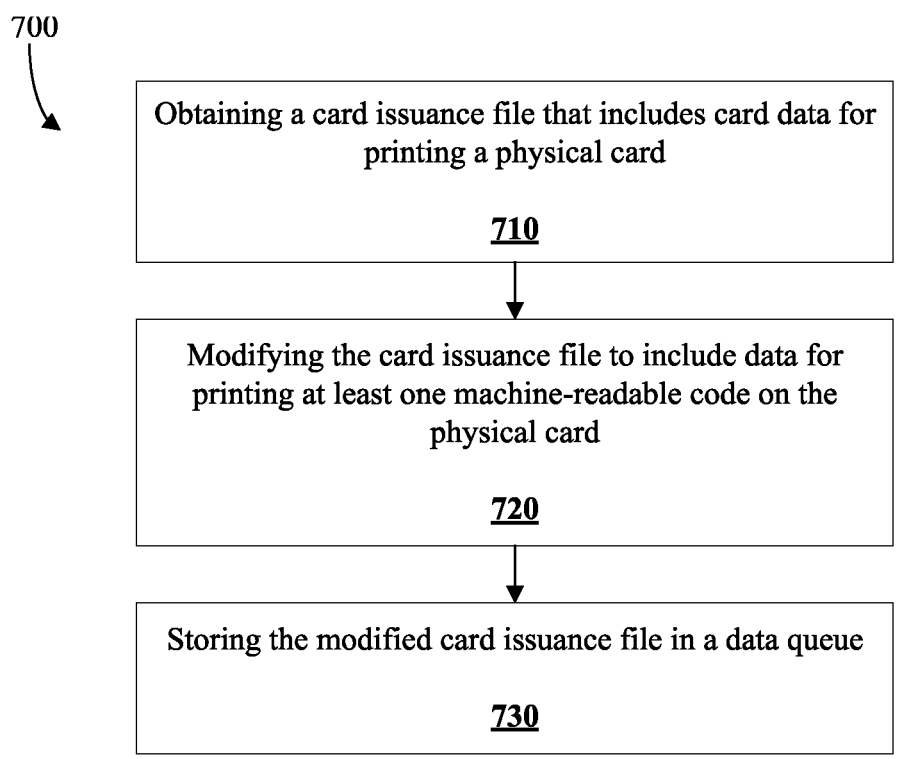
FIG. 7 is a flowchart showing operations performed by a server computer system in modifying a card issuance file according to an embodiment.

Responsive to generating the machine-readable code, the server computer system 120 may perform operations to modify a card issuance file that includes card data that is used to print a physical credit card for the credit card account. Reference is made to FIG. 7, which illustrates, in flowchart form, a method 700 for modifying a card issuance file. The method 700 may be implemented by a computing device having suitable processor-executable instructions for causing the computing device to carry out the described operations. The method 700 may be implemented, in whole or in part, by the server computer system 120.

The method 700 includes obtaining a card issuance file that includes card data for printing a physical card (step 710).

The card issuance file may be generated automatically when the server computer system 120 determines that the user is eligible for the new credit card or has renewed the existing credit card. The card issuance file may be generated to include card data that is used to print the physical credit card for the credit card account. The card data may include, for example, a card number, a card verification value, an expiration date, a name of the user who is receiving the credit card, etc. The card data may include additional details such as for example one or more graphic elements (logos, etc.) that are to be printed on the physical credit card.

The card issuance file may be generated prior to determining that the at least one machine-readable code is to be printed on the physical credit card. For example, the server computer system 120 may automatically generate a card issuance file every time a credit card application or renewal is submitted regardless of whether or not a request for modifying the card issuance file to include the at least one machine-readable code has been received. In this example, the card issuance file may be a standard card issuance file such that all credit cards printed using the standard card issuance file appear generally similar with the exception that the card number, card verification value, expiration date and the name of the user may differ.

The server computer system 120 may store the card issuance files in a data queue. The data queue may include a batch of credit card issuance files that are to be sent to a credit card printing system. In one or more embodiments, during step 710, the card issuance file may be obtained from the data queue and this may be done prior to the data queue being sent to the credit card printing system. The card issuance file may be identified by the server computer system 120 using, for example, the card number. As such, the server computer system 120 may retrieve the card issuance file by submitting a request to the data queue for the card issuance file that includes the card number. In this manner, the card issuance file may be obtained or retrieved from the data queue.

The method 700 includes modifying the card issuance file to include data for printing at least one machine-readable code on the physical card (step 720).

The server computer system 120 modifies the card issuance file to include the data for printing the at least one machine-readable code on the physical card. For example, the server computer system 120 may overlay an image that includes the machine-readable code on a graphic representing a front or a back of the physical card.

In one or more embodiments, the server computer system 120 may modify the card issuance file to include the at least one machine-readable code in at least one data field within the card issuance file. For example, the card issuance file may include a specification file that contains the definition and format for various data fields. The server computer system 120 may modify the specification file to include data for printing the at least one machine-readable code at a particular location on the physical card. For example, at least one definition may be associated with printing a machine-readable code and may be indicated as a mandatory option. The server computer system 120 may complete the definition by including the at least one machine-readable code.

In one or more embodiments, the server computer system 120 may analyze the card issuance file to identify one or more positions for the at least one machine-readable code. For example, the card issuance file may include a graphic representing a back and a front of the physical card. The server computer system 120 may analyze the card issuance file to identify one or more positions for the at least one machine-readable code and this may be done by identifying one or more positions on the front or the back of the card that are blank. The server computer system 120 may select a size for the machine-readable code and this may be based on the one or more positions. For example, the front of the card may have two positions available for the at least one machine-readable code where each available position has a different size. The server computer system 120 may select a size for the at least one machine-readable code based on the size of the position available. In embodiments where more than one position is available, the server computer system 120 may select the position that allows for the largest size of the machine-readable code. In this manner, the server computer system 120 may adjust the at least one machine-readable code such that the at least one machine-readable code is printed on the physical card at a size that fits within the position selected for the at least one machine-readable code.

The method 700 includes storing the modified card issuance file in a data queue (step 730).

Responsive to modifying the card issuance file, the server computer system 120 stores the modified card issuance file in a data queue. The data queue may include a batch of credit card issuance files that are to be sent to a credit card printing system.

In one or more embodiments, the card issuance file may have been obtained from the data queue prior to being modified. In these embodiments, the server computer system 120 may store the modified card issuance file in a same position of the data queue as it was obtained from. Put another way, the modified card issuance file may be stored in the data queue in the same position as the card issuance file that was modified. In this manner, the modified card issuance file may replace the card issuance file in the data queue. It will be appreciated that in one or more other embodiments, the modified card issuance file may be stored in the data queue in a different position than the unmodified card issuance file. For example, the modified card issuance file may be sent to a back of the data queue.

In one or more embodiments, the server computer system 120 may rearrange the data queue such that all card issuance files that have been modified are positioned adjacent to one another in the data queue and this may be done to increase an efficiency of the printing of the card issuance files as all modified card issuance files may be printed simultaneously.

In one or more embodiments, the card issuance file may have not been stored in the data queue before being modified. In these embodiments, the modified card issuance file may be stored in the data queue in a particular position such as for example at the back of the data queue.

The data queue may be structured as a first-in-first-out (FIFO) data queue such that the first card issuance file stored in the data queue may be the first card issuance file printed. Alternatively, the data queue may be structured as a last-in-last-out (LIFO) data queue such that the last card issuance file stored in the data queue may be the first card issuance file printed.

Figure 8:
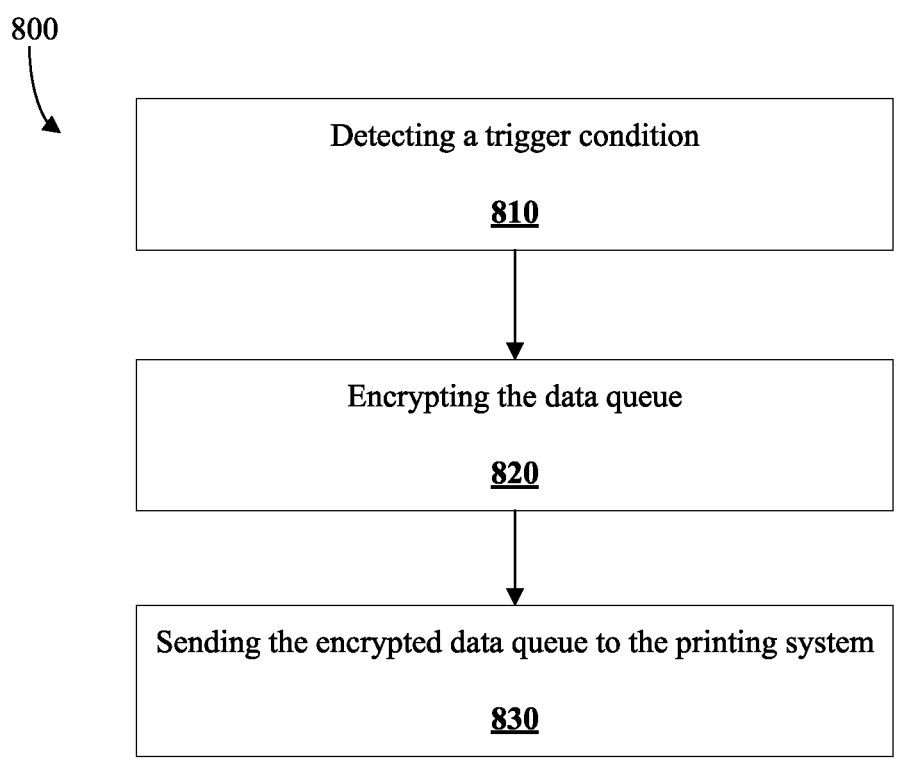
FIG. 8 is a flowchart showing operations performed by a server computer system in sending an encrypted data queue to a printing system according to an embodiment.

The data queue is stored or maintained by the server computer system 120 and may be sent to a printing system to print the physical cards in response to the detection of a trigger condition. Reference is made to FIG. 8, which illustrates, in flowchart form, a method 800 for sending an encrypted data queue to a printing system. The method 800 may be implemented by a computing device having suitable processor-executable instructions for causing the computing device to carry out the described operations. The method 800 may be implemented, in whole or in part, by the server computer system 120.

The method 800 includes detecting a trigger condition (step 810).

The trigger condition may include a total number of card issuance files in the data queue. For example, the data queue may be maintained by the server computer system 120 until a total number of card issuance files in the data queue reaches a particular number. The particular number may include, for example, one hundred (100) or five hundred (500) card issuance files. The server computer system 120 may monitor the total number of card issuance files in the data queue and in response to the total number being equal to the particular number, the server computer system 120 may detect the trigger condition.

The trigger condition may include expiration of a particular time. For example, the data queue may be maintained by the server computer system 120 until the end of a business day. The end of the business day may be at 5:00 pm on a particular business day. The server computer system 120 may detect the trigger condition when it is determined that the current time is 5:00 pm.

The method 800 includes encrypting the data queue (step 820).

In response to detecting the trigger condition, the server computer system 120 encrypts the data queue. In one or more embodiments, symmetric encryption may be used. Specifically, the server computer system 120 may generate a single key that may be used to encrypt and decrypt the data queue. The data queue is encrypted using the single key such that the data queue is unreadable without the single key. Example algorithms that may be used include Advanced Encryption Standard (AES), Triple DES (3DES), etc.

The method 800 includes sending the encrypted data queue to a printing system (step 830).

The encrypted data queue is sent to the printing system. Since the data queue is encrypted, it may be safely transmitted to and stored by the printing system. In a separate communication, the single key may be provided to the printing system. The printing system may use the single key to decrypt the data queue.

The printing system prints the physical cards in accordance with the card issuance files stored in the data queue. As mentioned, printing the physical cards may include printing, embossing or lasering the card data onto the physical cards. The at least one machine-readable code is printed on the physical card. The physical card may then be mailed or otherwise sent to the user.

During printing of the physical card, the machine-readable instructions of the modified card issuance file may cause the printing system to print the at least one machine-readable code on the physical card.

In manners described herein, the machine-readable code is printed on a physical card and as such it may be readily accessible at the point of sale. This may be particularly advantageous when payment at the point of sale is done using the physical card. For example, the physical credit card may be used to complete a transaction at the point of sale and the at least one machine-readable code encoded with loyalty point account data may be readily available to be scanned by a scanning device at the point of sale to provide the loyalty point account data to the scanning device.

Figure 9:
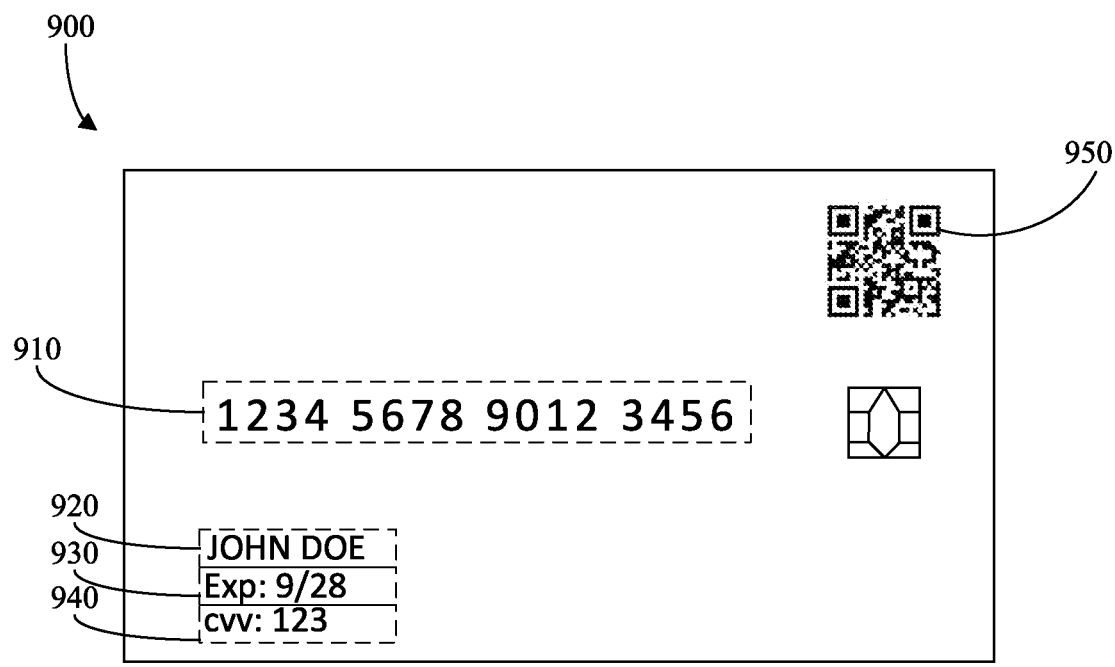
FIG. 9 is an example physical card printed by a printing system using a modified card issuance file according to an embodiment.

An example physical card 900 printed by a printing system using a modified card issuance file in accordance with the embodiments described herein is shown in FIG. 9.

As can be seen, the physical card 900 includes card data such as a credit card number 910, a name 920, an expiration date 930, and a card verification value 940. The physical card 900 also includes a machine-readable code 950. It will be appreciated that the machine-readable code 950 may have been added to the card issuance file by the server computer system 120 in accordance with embodiments described herein. The machine-readable code 950, when scanned by a scanning device, may provide loyalty point account data to the scanning device.

Figure 10:
FIG. 10 is another example physical card printed by a printing system using a modified card issuance file according to an embodiment.

Another example physical card 1000 printed by a printing system using a modified card issuance file in accordance with the embodiments described herein is shown in FIG. 10. As can be seen, the physical card 1000 is similar to the physical card 900 with the following exceptions. In this example, the physical card 1000 includes a first machine-readable code 1050 and a second machine-readable code 1060. The first machine-readable code 1050, when scanned by a scanning device, may provide a first type of loyalty point account data to the scanning device and the second machine-readable code 1060, when scanned by the scanning device, may provide a second type of loyalty point account data to the scanning device. The first type of loyalty point account data may be a loyalty point number of a first type of loyalty points and the second type of loyalty point account data may be a loyalty point number of a second type of loyalty points.

The methods described herein may be modified and/or operations of such methods combined to provide other methods.

Example embodiments of the present application are not limited to any particular operating system, system architecture, mobile device architecture, server architecture, or computer programming language.

It will be understood that the applications, modules, routines, processes, threads, or other software components implementing the described method/process may be realized using computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the herein discussed embodiments are considered to be illustrative and not restrictive.

What is claimed is:

1. A system comprising:
a communications module;
at least one processor coupled with the communications module; and
a memory coupled to the processor, the memory storing processor-executable instructions that, when executed, configure the at least one processor to:
retrieve a card issuance file that includes card data for printing a physical card from a data queue that includes a batch of card issuance files to be sent to a printing system;
modify the card issuance file to include data for printing at least one machine-readable code on the physical card; and
store the modified card issuance file back in the data queue that includes the batch of card issuance files to be sent to the printing system.

2. The system of claim 1, wherein the instructions, when executed, further configure the at least one processor to:
receive a request to modify the card issuance file to include the at least one machine-readable code on the physical card.

3. The system of claim 1, wherein the instructions, when executed, further configure the at least one processor to:
generate the at least one machine-readable code to provide data to a scanning device in response to being scanned by the scanning device.

4. The system of claim 1, wherein the instructions, when executed, further configure the at least one processor to:
analyze the card issuance file to identify at least one position for the at least one machine-readable code on the physical card, the card issuance file modified to include the data for printing the at least one machine-readable code on the physical card at the at least one position on the physical card.

5. The system of claim 1, wherein the instructions, when executed, further configure the at least one processor to:
send an application programming interface request that defines content to be encoded on the at least one machine-readable code;
receive an application programming interface response that includes the at least one machine-readable code;
extract image data that includes the at least one machine-readable code from the application programming interface response; and
store the image data in a database.

6. The system of claim 5, wherein the content to be encoded on the at least one machine-readable code includes account data received together with a request to generate the card issuance file.

7. The system of claim 6, wherein the account data includes loyalty point account data.

8. The system of claim 1, wherein the instructions, when executed, further configure the at least one processor to:
encrypt the data queue; and
send the encrypted data queue to the printing system.

9. The system of claim 8, wherein the encrypted data queue is sent to the printing system in response to detecting a trigger condition.

10. A computer-implemented method performed by at least one processor, the method comprising:
retrieving a card issuance file that includes card data for printing a physical card from a data queue that includes a batch of card issuance files to be sent to a printing system;
modifying the card issuance file to include data for printing at least one machine-readable code on the physical card; and
storing the modified card issuance file back in the data queue that includes the batch of card issuance files to be sent to the printing system.

11. The computer-implemented method of claim 10, further comprising:
receiving a request to modify the card issuance file to include the at least one machine-readable code on the physical card.

12. The computer-implemented method of claim 10, further comprising:
generating the at least one machine-readable code to provide data to a scanning device in response to being scanned by the scanning device.

13. The computer-implemented method of claim 10, further comprising:
analyzing the card issuance file to identify at least one position for the at least one machine-readable code on the physical card, the card issuance file modified to include the data for printing the at least one machine-readable code on the physical card at the at least one position on the physical card.

14. The computer-implemented method of claim 10, further comprising:
sending an application programming interface request that defines content to be encoded on the at least one machine-readable code;
receiving an application programming interface response that includes the at least one machine-readable code;
extracting image data that includes the at least one machine-readable code from the application programming interface response; and
storing the image data in a database.

15. The computer-implemented method of claim 14, wherein the content to be encoded on the at least one machine-readable code includes account data received together with a request to generate the card issuance file.

16. The computer-implemented method of claim 10, further comprising:
encrypting the data queue; and
sending the encrypted data queue to the printing system.

17. The computer-implemented method of claim 16, wherein the encrypted data queue is sent to the printing system in response to detecting a trigger condition.

18. At least one non-transitory computer readable storage medium comprising processor-executable instructions which, when executed, configure at least one processor to:
retrieve a card issuance file that includes card data for printing a physical card from a data queue that includes a batch of card issuance files to be sent to a printing system;
modify the card issuance file to include data for printing at least one machine-readable code on the physical card; and
store the modified card issuance file back in the data queue that includes the batch of card issuance files to be sent to the printing system.

* * * * *